United States Patent
Kim et al.

(10) Patent No.: US 7,682,732 B2
(45) Date of Patent: Mar. 23, 2010

(54) SECONDARY BATTERY MODULE HAVING PROTRUSIONS ON A BARRIER RIB

(75) Inventors: Tae-Yong Kim, Suwon-si (KR); Gun-Goo Lee, Suwon-si (KR); Yoon-Cheol Jeon, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1131 days.

(21) Appl. No.: 11/166,403

(22) Filed: Jun. 23, 2005

(65) Prior Publication Data

US 2005/0287426 A1 Dec. 29, 2005

(30) Foreign Application Priority Data

Jun. 25, 2004 (KR) .................... 10-2004-0048155

(51) Int. Cl.
*H01M 6/42* (2006.01)
*H01M 2/00* (2006.01)

(52) U.S. Cl. ................ 429/149; 429/148; 429/120; 429/156

(58) Field of Classification Search ............. 429/149, 429/153, 157, 148, 156, 82, 83, 120, 99, 429/100

See application file for complete search history.

(56) References Cited

U.S. PATENT DOCUMENTS

| | | |
|---|---|---|
| 3,745,048 A | 7/1973 | Dinkler et al |
| 6,051,328 A | 4/2000 | Witzigreuter et al. |
| 6,475,659 B1 * | 11/2002 | Heimer ................ 429/66 |

FOREIGN PATENT DOCUMENTS

| | | |
|---|---|---|
| EP | 1 117 138 A1 | 7/2001 |
| EP | 1 139 483 A1 | 10/2001 |
| JP | 2-138858 | 11/1990 |
| JP | 8-321329 | 12/1996 |
| JP | 10-112301 | 4/1998 |
| JP | 2001-23702 | 1/2001 |
| JP | 2001-196103 | 7/2001 |
| JP | 2001-283937 | 10/2001 |
| JP | 2003-7355 | 1/2003 |
| JP | 2004-047426 | 2/2004 |

OTHER PUBLICATIONS

European Search Report, dated Sep. 14, 2005, for Application No. 05105702.4-2119, in the name of Samsung SDI Co., Ltd.
European Patent Office Patent Abstracts of Japan for Publication No. 2001023702; Publication Date Jan. 26, 2001, in the name of Toyohiko Eto.
European Patent Office Patent Abstracts of Japan for Publication No. 2003007355; Publication Date Jan. 10, 2003, in the name of Teruhiko Yamaguchi.
Patent Abstracts of Japan for Publication No. 08-321329; Date of publication of application Dec. 3, 1996, in the name of Hideki Okajima et al.

* cited by examiner

*Primary Examiner*—Raymond Alejandro
(74) *Attorney, Agent, or Firm*—Christie, Parker & Hale, LLP

(57) ABSTRACT

A secondary battery module has a plurality of unit batteries adjacently spaced apart from each other. A barrier rib is disposed between adjacent unit batteries, the barrier rib having a plurality of protrusions.

16 Claims, 18 Drawing Sheets

SECONDARY BATTERY MODULE HAVING PROTRUSIONS ON A BARRIER RIB

CROSS-REFERENCE TO RELATED APPLICATION

This application claims priority to and the benefit of Korean Patent Application No. 10-2004-0048155 filed in the Korean Intellectual Property Office on Jun. 25, 2004, the entire content of which is incorporated herein by reference.

BACKGROUND OF THE INVENTION

1. Field of the Invention

The present invention relates to a secondary battery, and more particularly, to a secondary battery module having a plurality of unit batteries and a barrier rib for the secondary battery module.

2. Description of the Related Art

Unlike a primary battery, the secondary battery may be recharged. Lower power batteries are used for various portable electronic devices such as cellular phones, laptop computers, and camcorders. Bulk size batteries are used as the power source for motor drive, such as in hybrid electric vehicles.

Depending on the external shape, secondary batteries may be classified into different types, for example, square and cylindrical batteries. When they are used for motor drive of the machines requiring a high power source such as the hybrid electric vehicles, the secondary batteries may form a secondary battery module of high power.

The secondary battery module is formed by serially connecting several secondary batteries (hereinafter "unit battery"), and each of the unit batteries includes an electrode assembly in which a separator is interposed between a positive electrode and a negative electrode. The electrode assembly is inserted inside a container, and a cap assembly is assembled with the container to seal the container. The cap assembly includes terminals disposed extending from the inside to the outside of the container and are electrically connected to a positive electrode and a negative electrode, respectively.

In addition, if the unit batteries are square type batteries, the unit batteries are arranged to alternate positive and negative terminals of one unit battery projected from the upper portion of the cap assembly with the positive and negative terminals of an adjacent unit battery. Adaptors of the electric conductor are typically mounted on threaded negative and positive terminals such that they are electrically connected with each other to form the battery module.

Since the battery module connects several to tens of unit batteries to form one battery module, there is a need to efficiently emit heat generated from each unit battery. In particular, when the unit battery is used as bulk size secondary batteries for motor drive such as in electric vehicles, hybrid electric vehicles, motor scooters, and vacuum cleaners, the heat emission is of significant importance.

If the heat emission does not occur properly, the temperature of the battery module may excessively increase due to the heat generated from each unit battery, and accordingly, not only the battery module but also the machines with the battery module, can malfunction.

Accordingly, when forming the battery module, a barrier rib is disposed between unit batteries, and the space between unit batteries formed by the barrier rib is used not only for cooling unit batteries but also for preventing distortion due to heat expansion of the unit batteries.

To perform such functions, the barrier rib needs sufficient strength and structure for efficient heat emission.

However, barrier ribs in the conventional secondary battery module do not satisfy the above two conditions simultaneously so there is difficulty in forming secondary battery modules of the quality which consumers expect.

That is, if the barrier ribs ensure the sufficient strength, its manufacturing cost is increased and there is restriction in designing a passage of cooling air. Alternatively, if the barrier ribs are formed having high cooling efficiency, they tend to exhibit structural weakness.

SUMMARY OF THE INVENTION

In accordance with the present invention a secondary battery module is provided in which a barrier rib not only has structural strength enough to maintain the shape of a unit battery but also efficiently controls the temperature of a unit battery.

According to one aspect of the present invention, a secondary battery module includes a plurality of unit batteries adjacently spaced apart from each other, and a barrier rib disposed between adjacent unit batteries, the barrier rib having a plurality of protrusions.

The barrier rib may have a plate shaped base, and a plurality of the protrusions may be formed on the base.

The plurality of the protrusions may be disposed on one surface of the base.

The protrusion may have a conical or pyramid shape.

The protrusion may have a cylindrical or prism shape.

The protrusion may have a hemisphere shape.

The secondary battery module may further include an auxiliary barrier rib disposed between the barrier rib and the unit battery.

The auxiliary barrier rib may have a plate shaped base having a flat surface.

The auxiliary barrier rib may have a plate shaped base, and a plurality of protrusions formed on the base.

The barrier rib and the auxiliary barrier rib may be in contact with each other and disposed between the unit batteries.

The protrusion of the barrier rib may be in contact with the base of the auxiliary barrier rib, and the protrusion of the auxiliary barrier rib may be in contact with the base of the barrier rib.

The protrusion of the barrier rib is contacted with the protrusion of the auxiliary barrier rib.

The protrusion may have a shape with an inclined plane inclined at a predetermined angle with respect to one surface of the barrier rib.

The secondary battery module may meet the following formula:

$$45° \leq \alpha \leq 90°$$

where $\alpha$ is the angle.

The protrusions may be formed in a staggered array on the base, and the secondary battery module may meet the following formula:

$$30° \leq \beta \leq 150°$$

where $\beta$ is, with respect to one protrusion disposed in a column, an angle between other protrusions which are adjacent to the one protrusion and disposed in other directions intersecting the one protrusion.

The protrusion may be formed in a lattice array on the base.

The secondary battery module may include a housing mounting the plurality of unit batteries and barrier ribs and having a cooling medium input and output adapted for use in a motor driven device.

DETAILED DESCRIPTION

Figure 1:
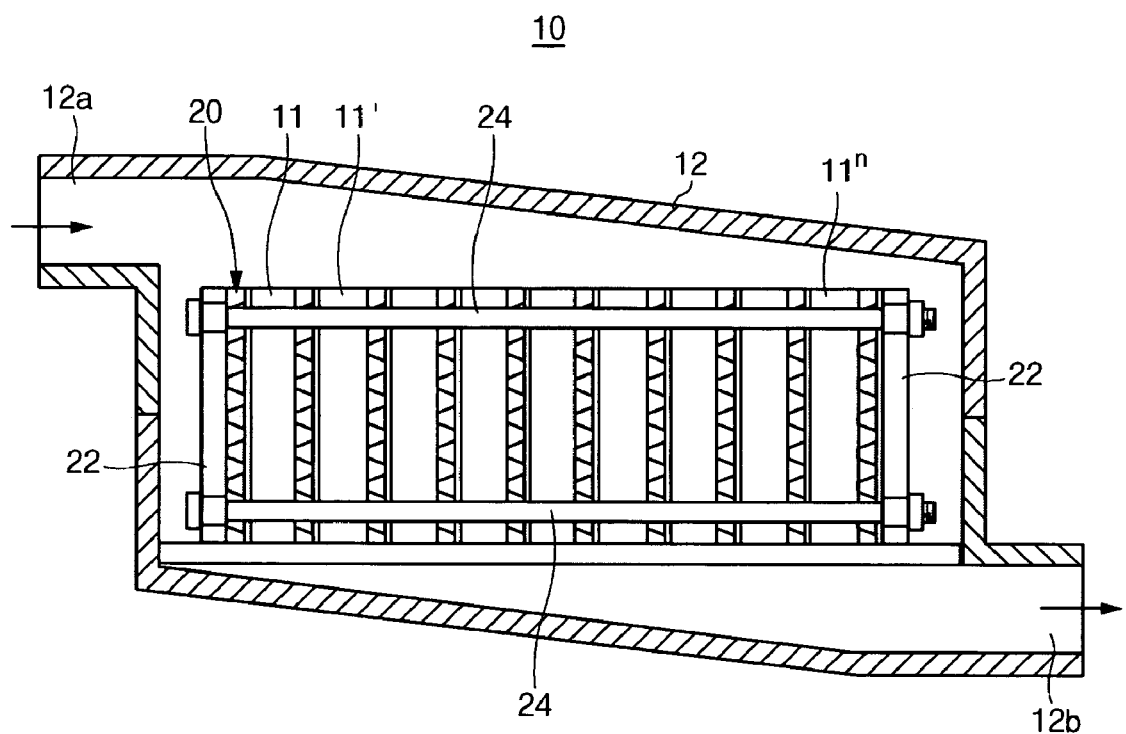
FIG. 1 is a schematic cross sectional side view of a secondary battery module according to one embodiment of the present invention.

Referring to FIG. 1, a secondary battery module 10 according to the present embodiment includes a plurality of unit batteries 11, $11^1$ ... $11^n$ spaced apart from each other at a predetermined distance.

The unit battery 11 according to the present embodiment is a square type secondary battery, which, as a general secondary battery, includes a container, an electrode assembly including a positive electrode, a negative electrode, and a separator to be inserted to the container, and a cap assembly disposed in the container.

Barrier ribs 20 are disposed between the unit batteries 11, $11^1$ ... $11^n$ to flow cooling medium (e.g., air in the present embodiment) between the unit batteries 11, $11^1$ ... $11^n$, and to be connected to the unit batteries 11, $11^1$ ... $11^n$ and support them.

Such unit batteries 11, $11^1$ ... $11^n$ and barrier ribs 20 are fixed in place by fastening plates 22 and fastening rods 24 to form an assembly.

The assembly is mounted in a housing 12 having an inlet 12a receiving air and an outlet 12b discharging the air which cools the unit batteries 11. Such a housing could form part of a power/air flow system of a motor drive of machine systems, including hybrid electric vehicles.

The inlet 12a is disposed in one side of the upper portion of the housing 12, and the outlet 12b is disposed in one side of the lower portion of the housing 12 being opposite to the inlet 12a. However, the structure of the housing 12 is only one example of the secondary battery modules that the present invention can adopt, and is not limited thereto.

Such a secondary battery module 10 enables the air incoming inside the housing 12 through the inlet 12a of the housing 12 to flow from the upper portion to the lower portion of the housing 12 and to exit outside the housing 12 through the outlet 12b of the housing 12.

During this process, the air passes through the barrier ribs 20, and heat generated from the unit batteries 11, $11^1$ ... $11^n$ are heat-exchanged by the air, which can cool them.

In the following, the details of secondary battery module 10 having the above function will be described.

Figure 2:
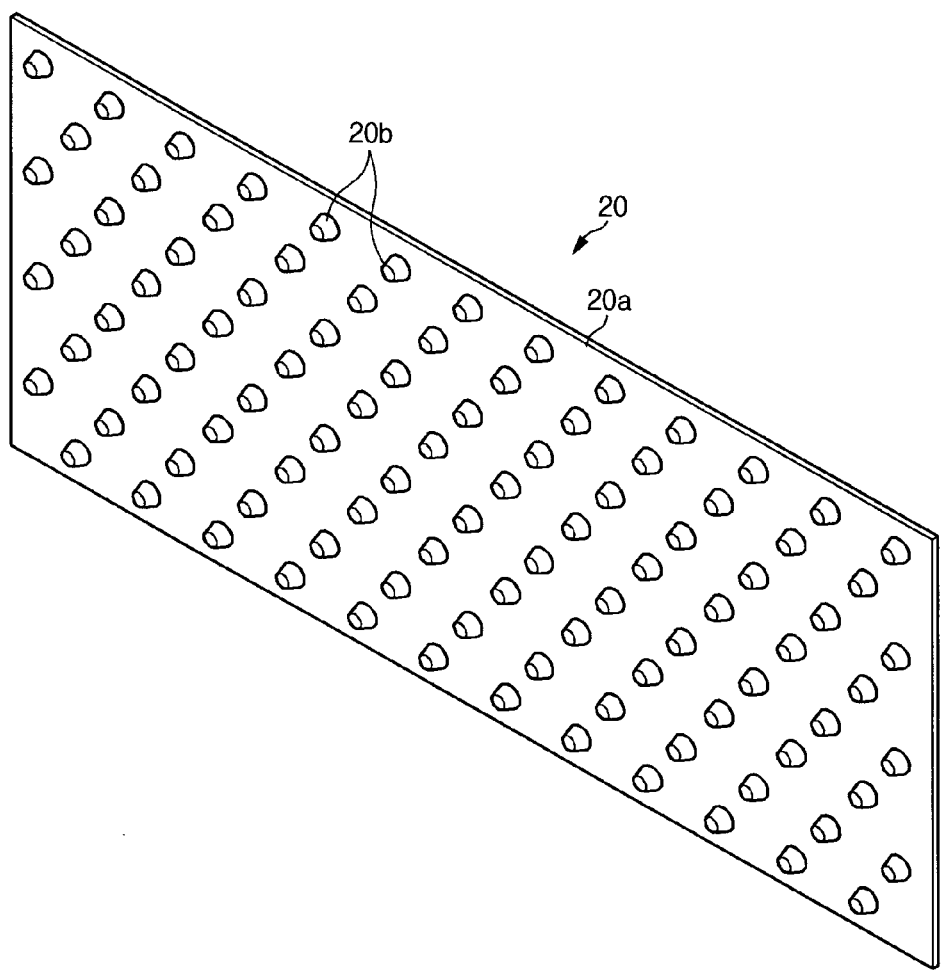
FIG. 2 is a perspective view of a barrier rib according to a first embodiment of the present invention.

Now referring to FIG. 2, a barrier rib 20 of the secondary battery module 10 includes a plate shaped base 20a with a size corresponding to the size of the side surface of a unit battery 11 and having a plurality of protrusions 20b formed on the base 20a. The protrusions 20b are protruded from one surface of the base 20a, and spaced apart from each other at a predetermined distance.

Figure 3:
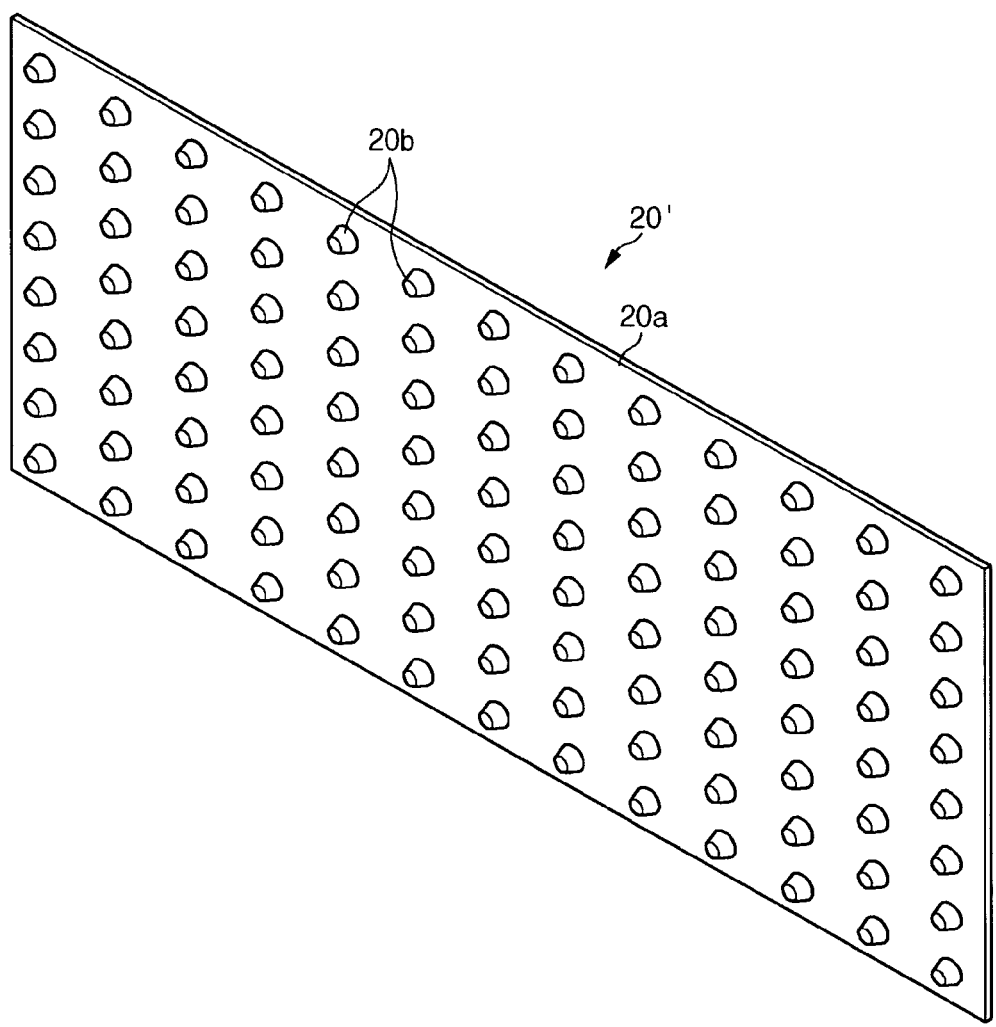
FIG. 3 is a perspective view illustrating another array of protrusions of the barrier rib according to the fist embodiment of the present invention.

The protrusions 20b may be formed in a vertically or horizontally staggered array, or in a lattice array 20' as shown in FIG. 3.

Figure 4:
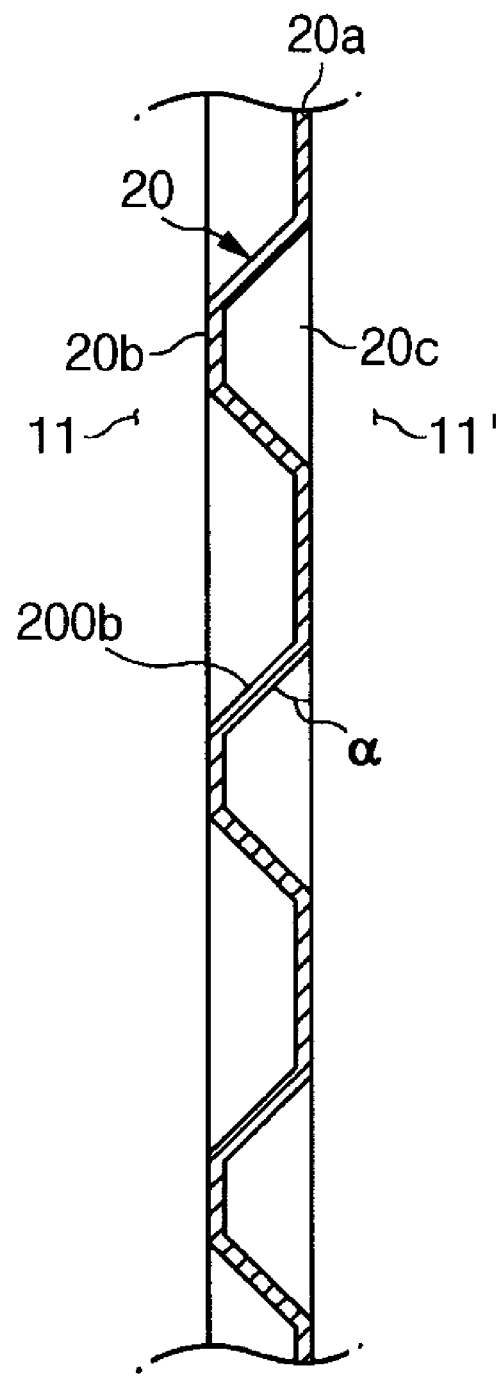
FIG. 4 is a partial cross sectional view of the secondary battery module having the barrier rib according to the fist embodiment of the present invention.

In addition, the protrusions 20b protrude from the base 20a as a solid protrusion, or they may protrude from the base 20a having a hollowed-out inside groove 20c as shown in FIG. 4. In the following embodiments, the protrusions have the latter type of protrusion.

The protrusions 20b of the present embodiment have a conical shape with a cutaway apex area that is wide at the top and narrow at the bottom.

When the barrier rib 20 is disposed between the unit batteries 11, $11^1$ ... $11^n$ to form an assembly, the front ends of the protrusions 20b are closely contacted with the side surface of one unit battery 11, and the side surface of the base 20a is closely contacted with the side surface of the other unit battery $11^1$.

Such an arrangement of the barrier rib 20 is applied to all the barrier ribs 20 disposed between the unit batteries 11, $11^1$ ... $11^n$.

The above arrangement enables the distances between the unit batteries 11, $11^1$ ... $11^n$ to be maintained at a predetermined size, and the heat generated from the unit batteries 11, $11^1$ ... $11^n$ may be cooled by the air passing through the space formed between the protrusions 20b.

The protrusions 20b of the present embodiment have a conical shape with a cutaway apex area that is wide at the top and narrow at the bottom. That is, they have a shape with an inclined plane 200b inclined at a predetermined angel ($\alpha$) with respect to one surface of the barrier rib 20, i.e. one surface of the base 20a (FIG. 4).

The angle ($\alpha$) is set considering the strength characteristic of the protrusions 20b. That is, if the unit battery is under an abnormal condition and the internal pressure of the unit battery is increased to force compressive stress to the protrusions 20b, the protrusions 20b should have strength enough to endure the stress. Otherwise, the barrier rib 20 cannot support the unit battery firmly and accordingly, the safety vent for safety of the unit battery is not broken at a predetermined pressure value but is broken at a higher pressure value, which causes the unstable operation. Therefore, the whole battery module may be put into a dangerous condition.

Considering such a problem, the angle ($\alpha$) meets the following formula to allow the protrusions 20b to have enough strength:

$$45° \leq \alpha \leq 90°$$

i)

In one exemplary embodiment the angle (α) would meet the following formula:

$$50° \leq \alpha \leq 70° \quad \text{i)}$$

In another exemplary embodiment, the angle (α) would meet the following formula:

$$55° \leq \alpha \leq 65° \quad \text{i)}$$

The below Table 1 shows the strength and the cooling efficiency of the barrier ribs of examples according to the present invention. In the Table 1, the lower of the compressive pressure means the higher of the strength. The volume efficiency is defined as the volume ratio of protrusions to flowing space of cooling medium (volume of protrusions in flowing space/flowing space), and the higher of the volume efficiency means the higher of the cooling efficiency.

The barrier ribs of examples according to the present invention in Table 1 below have protrusions with an angle (α) of 60° or 90°. The barrier ribs of the present examples were formed by press process or injection process, and are made of aluminum

TABLE 1

| | Press Process Compressive Pressure (Mpa) | Injection Process Compressive Pressure (Mpa) | Volume efficiency (%) |
|---|---|---|---|
| Example 1 (α = 60°) | 58.19 | 29.16 | 89 |
| Example 2 (α = 90°) | 61.12 | 33.71 | 86 |

If the angle is greater than 90°, the shape of the protrusions is restricted so it is difficult to form the protrusions. If the angle is less than 45°, the strength of the protrusions is lowered so they can be easily broken.

FIGS. 5A to 7C shows modified examples of the first embodiment of the present invention, and these modified examples have various shapes of protrusions.

Figure 5A:
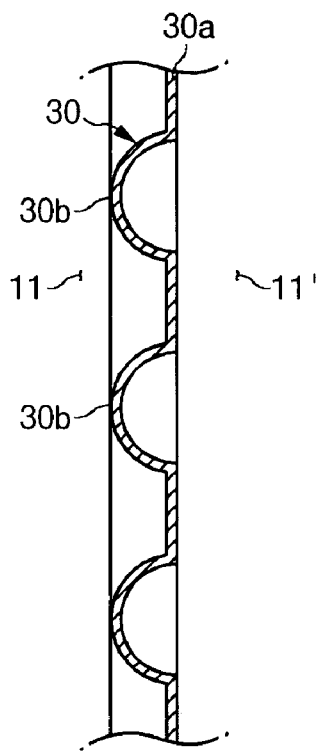
FIGS. 5A, 5B, 6A, 6B, 6C, 7A, 7B and 7C are partial cross sectional views of secondary battery modules according to modified examples of the first embodiment of the present invention.
Figure 5B:
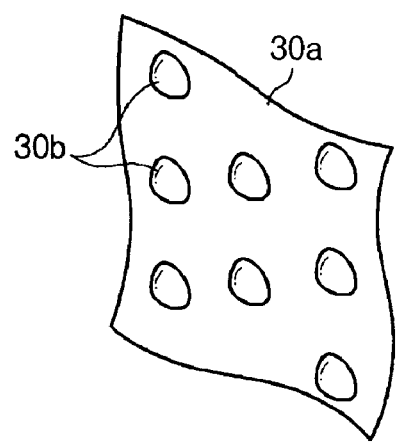

In FIGS. 5A to 5B, a protrusion 30b formed on a base 30a in a barrier rib 30 has a hemisphere shape.

Figure 6A:
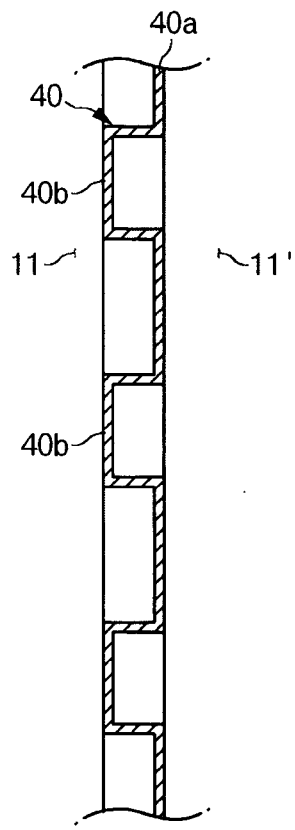
Figure 6B:
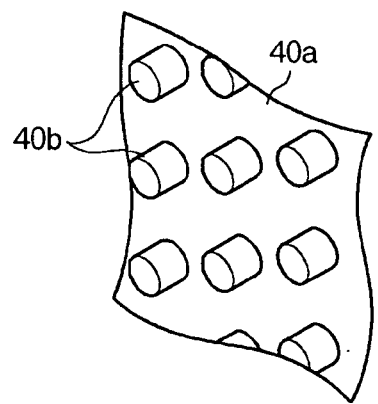
Figure 6C:
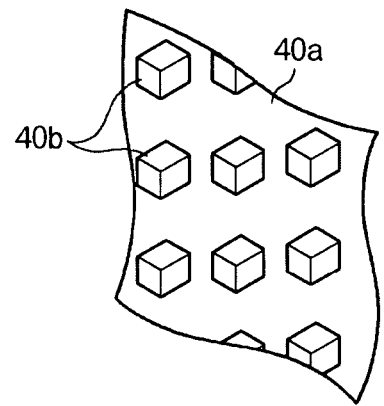

In FIGS. 6A to 6C, a protrusion 40b formed on a base 40a in a barrier rib 40 has a shape of a cylinder (FIG. 6B) or prism such as a rectangular prism (FIG. 6C). The inclined plane of the prism may be formed to meet the above angle (α).

Figure 7A:
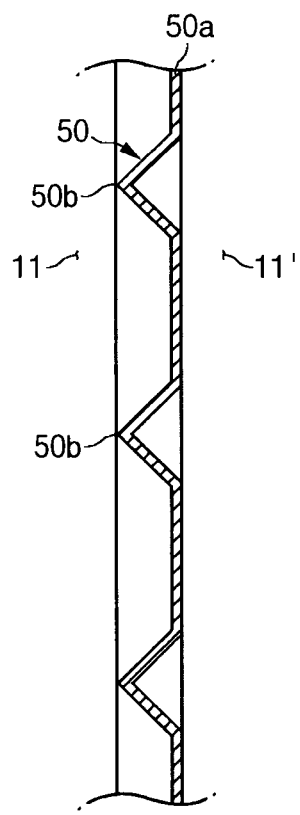
Figure 7B:
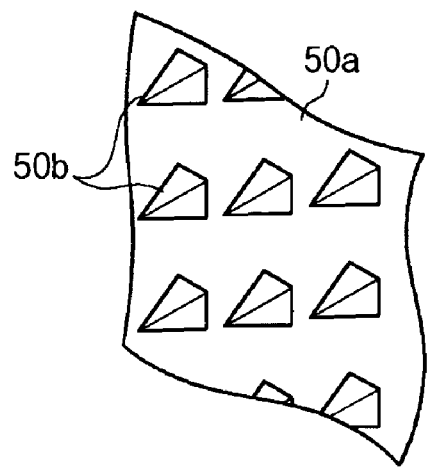
Figure 7C:
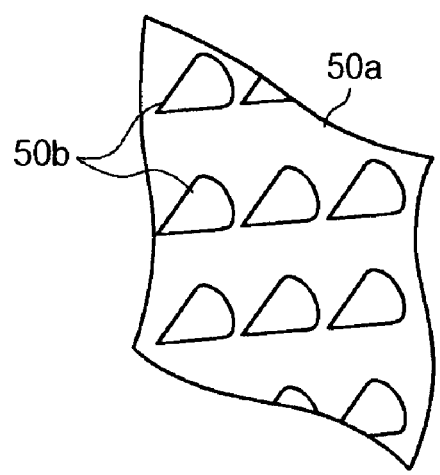

In FIGS. 7A to 7C, a protrusion 50b formed on a base 50a in a barrier rib 50 has a shape of a cone (FIG. 7B) or pyramid such as a quadrangular pyramid (FIG. 7C). The inclined plane of the cone or pyramid may be formed to meet the above angle (α).

FIGS. 8 to 11 are cross sectional views of a secondary battery module according to a second embodiment of the present invention. The secondary battery module 60 according to the second embodiment basically has a similar overall structure as that of the first embodiment, except that it further includes another barrier rib, i.e., an auxiliary barrier rib 65 disposed between a unit battery 61 and a unit battery 61[1] together with a barrier rib 63 much like the barrier rib of the previous embodiment.

The auxiliary barrier rib 65 may have a size corresponding to the size of the barrier rib 63 and its entire surface may be flat. Its thickness and material may be the same as those of the barrier rib 63.

The battery module 60 of the second embodiment is different from that of the first embodiment in that the auxiliary barrier rib 65 contacts with the side surface of the unit battery 61 rather than the protrusions 63a of the barrier rib 63. Accordingly, the contact area with the unit battery 61 is increased and thereby the emission of heat generated from the unit battery 61 is more efficient. Also, it can prevent the protrusions 63a from distorting the side surface of the unit battery 61.

Figure 8:
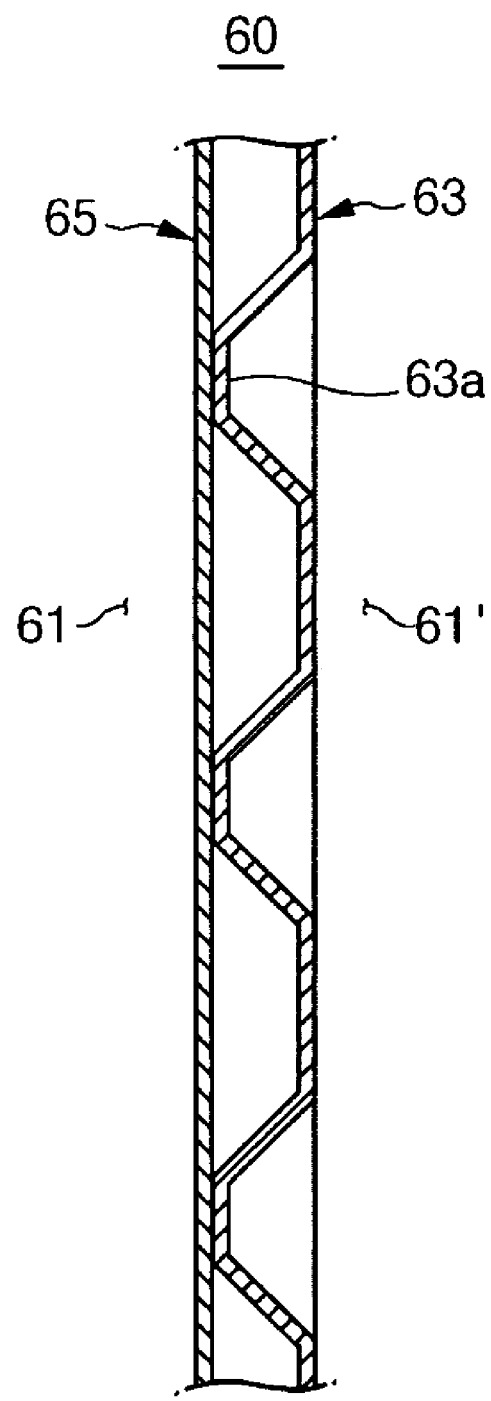
FIG. 8 is a partial cross sectional view of a secondary battery module having a barrier rib according to a second embodiment of the present invention.
Figure 9:
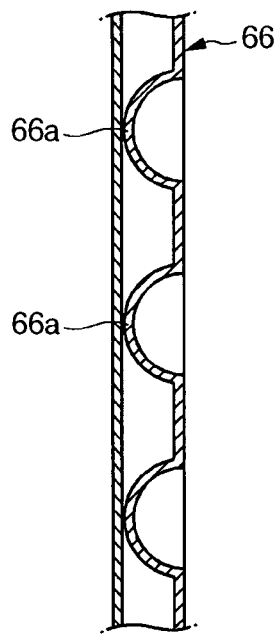
FIGS. 9, 10 and 11 are partial cross sectional views of secondary battery modules according to first modified examples of the second embodiment of the present invention.
Figure 10:
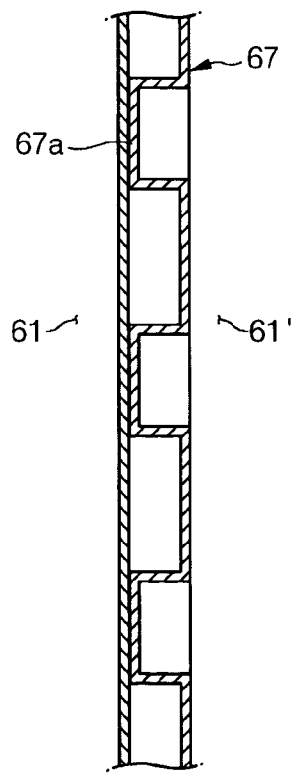
Figure 11:
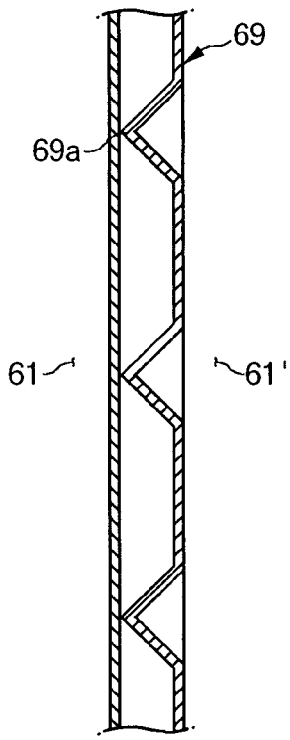

FIGS. 9 to 11 show secondary battery modules according to first examples of the second embodiment in which the basic structure is the same as that of FIG. 8, but the protrusions formed on the barrier rib have different shapes.

In FIG. 9, a protrusion 66a of a barrier rib 66 has a hemisphere shape. In FIG. 10, a protrusion 67a of a barrier rib 67 has a shape of a cylinder or prism. In FIG. 11, a protrusion 69a of a barrier rib 69 has a shape of a cone or pyramid.

FIGS. 12 to 15 show cross sectional views illustrating the structure of secondary battery modules according to second modified examples of the second embodiment of the present invention.

Figure 12:
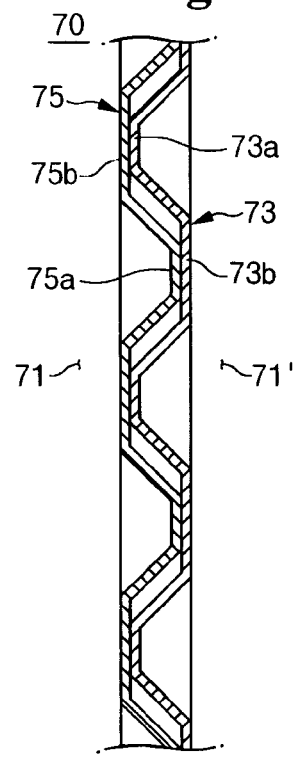
FIGS. 12, 13, 14 and 15 are partial cross sectional views of secondary battery modules according to second modified examples of the second embodiment of the present invention.

With reference now to FIG. 12, the secondary battery module 70 has a barrier rib 73 and an auxiliary barrier rib 75 disposed between a unit battery 71 and a unit battery 71[1] much like the above second embodiment. However, the auxiliary barrier rib 75 does not have the structure that the entire surface is flat like the auxiliary barrier rib of the second embodiment, but has the structure that a plurality of protrusions 75b are formed on its base 75a much like the barrier rib 73. That is, in the second modified examples, the auxiliary barrier rib 75 has a plurality of the protrusions 75b as well as the barrier rib 73 has a plurality of the protrusions 73b on the base 73a.

The protrusions 73b and 75b have the same shape as those described in the first embodiment.

When the barrier rib 73 and the auxiliary barrier rib 75 are disposed between the unit batteries 71 and 71[1], barrier rib 73 contacts unit battery 71[1] and auxiliary barrier rib 75 contacts unit battery 71. In the second modified examples, the protrusions 73b and 75b are disposed not to overlap each other. That is, the protrusions 73b of the barrier rib 73 are in contact with the base 75a of the auxiliary barrier rib 75, and the protrusions 75b of the auxiliary barrier rib 75 are in contact with the base 73a of the barrier rib 73, and thereby the barrier rib 73 the auxiliary barrier rib 75 are, in essence, combined with each other.

Such an arrangement of the barrier rib 73 and the auxiliary barrier rib 75 can increase the strength of the barrier rib 73 and the auxiliary barrier rib 75 due to a staggered array of the protrusions 73b and 75b, and therefore, can more stably support the unit batteries 71 and 71[1].

Figure 13:
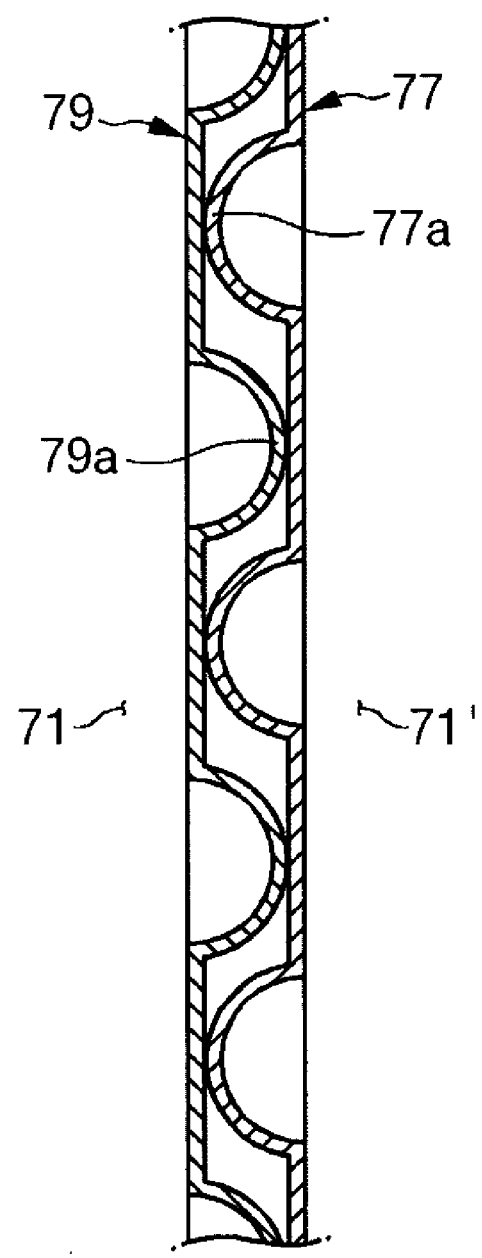
Figure 14:
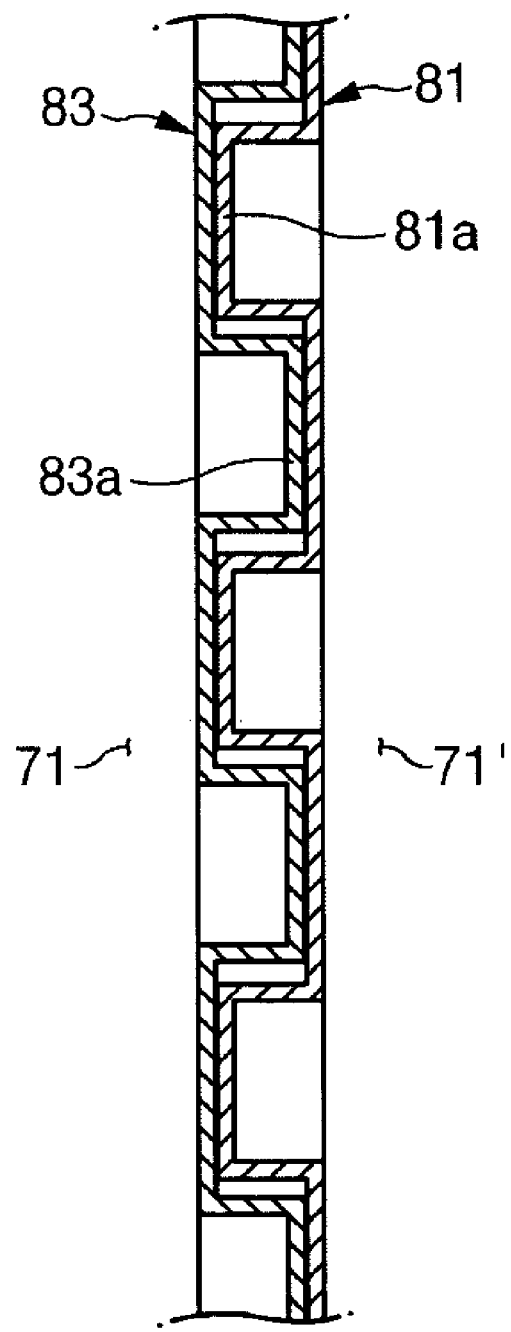

FIGS. 13 to 14 show the secondary battery module in which the basic structure is the same as that of FIG. 12, but the protrusions formed on the barrier rib and the auxiliary barrier rib have different shapes.

Figure 15:
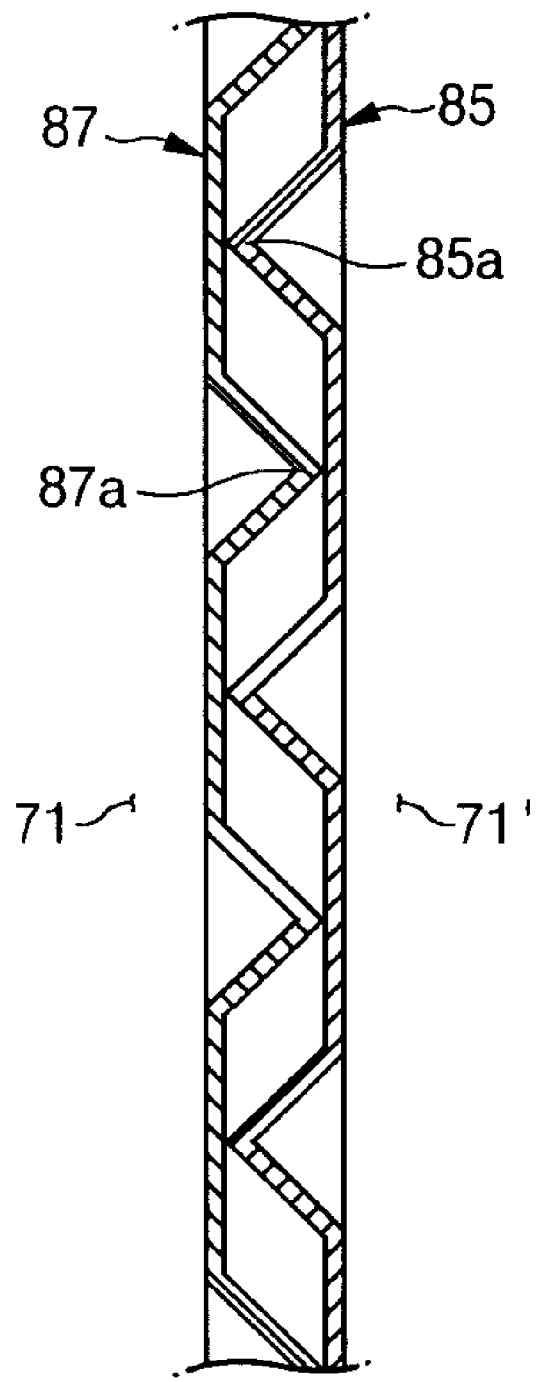

In FIG. 13, a protrusion 77a of a barrier rib 77 and a protrusion 79a of an auxiliary barrier rib 79 have a hemisphere shape. In FIG. 14, a protrusion 81a of a barrier rib 81 and a protrusion 83a of an auxiliary barrier rib 83 have a shape of a cylinder or prism. In FIG. 15, a protrusion 85a of a barrier rib 85 and a protrusion 87a of an auxiliary barrier rib 87 have a shape of a cone or pyramid.

FIGS. 16 to 19 show cross sectional views illustrating the structure of secondary battery modules according to third modified examples of the second embodiment of the present invention.

Figure 16:
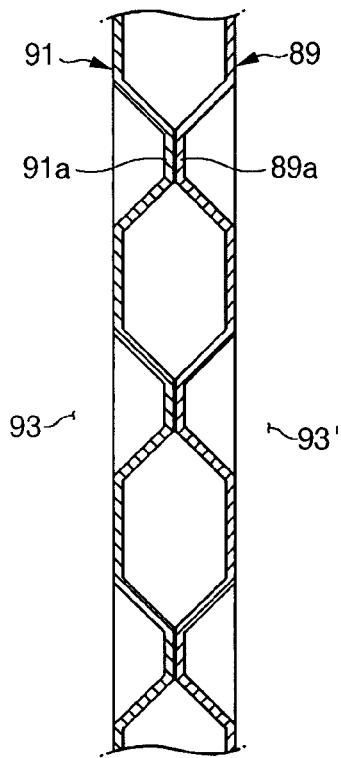
FIGS. 16, 17, 18 and 19 are partial cross sectional views of secondary battery modules according to third modified examples of the second embodiment of the present invention.

With reference to FIG. 16, in the third modified example both of a barrier rib 89 and an auxiliary barrier rib 91 have protrusions 89a and 91a much like the first modified example, except that these protrusions 89a and 91a are disposed between and contact unit batteries 93 and 93[1].

Such an arrangement of the barrier rib 89 and the auxiliary barrier rib 91 can increase the strength of the barrier rib 89 and the auxiliary barrier rib 91 due to the protrusions 89a and 91a, and therefore, can support the unit batteries 93 and 93[1] more stably, much like the first modified example. In addition, it can expand the air flow channel formed between the protrusions 89a and 91a to enhance the cooling efficiency for the unit batteries 93 and 93[1].

Figure 17:
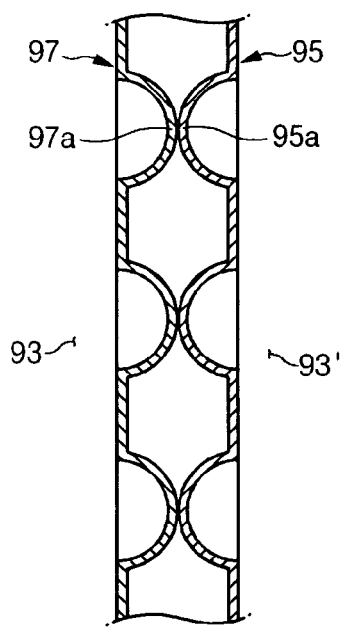
Figure 18:
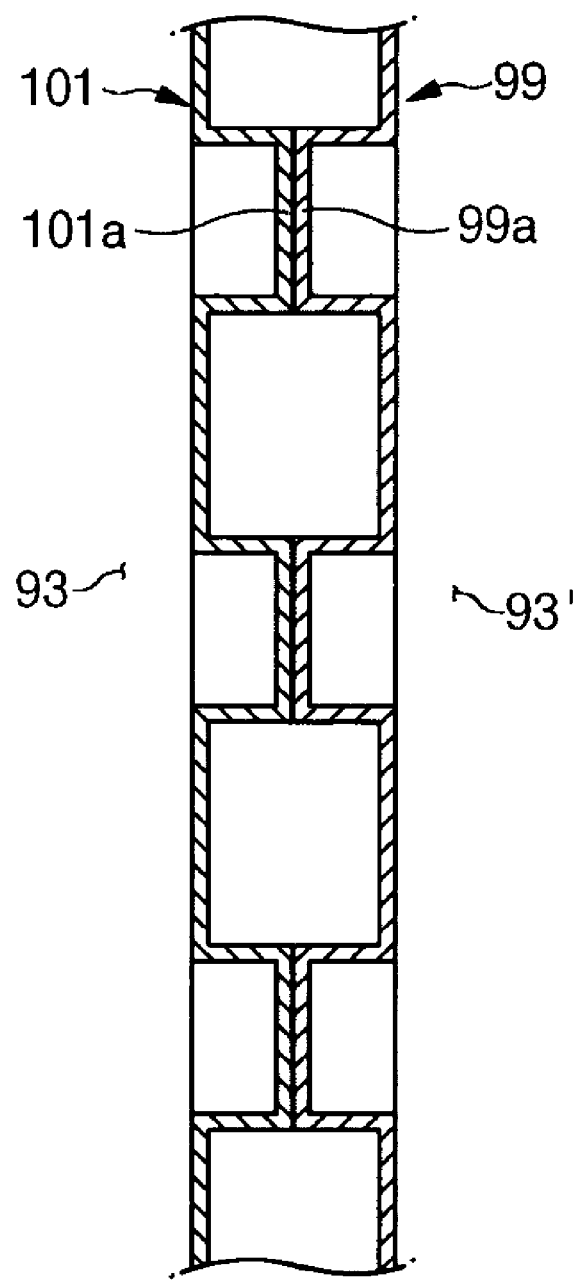
Figure 19:
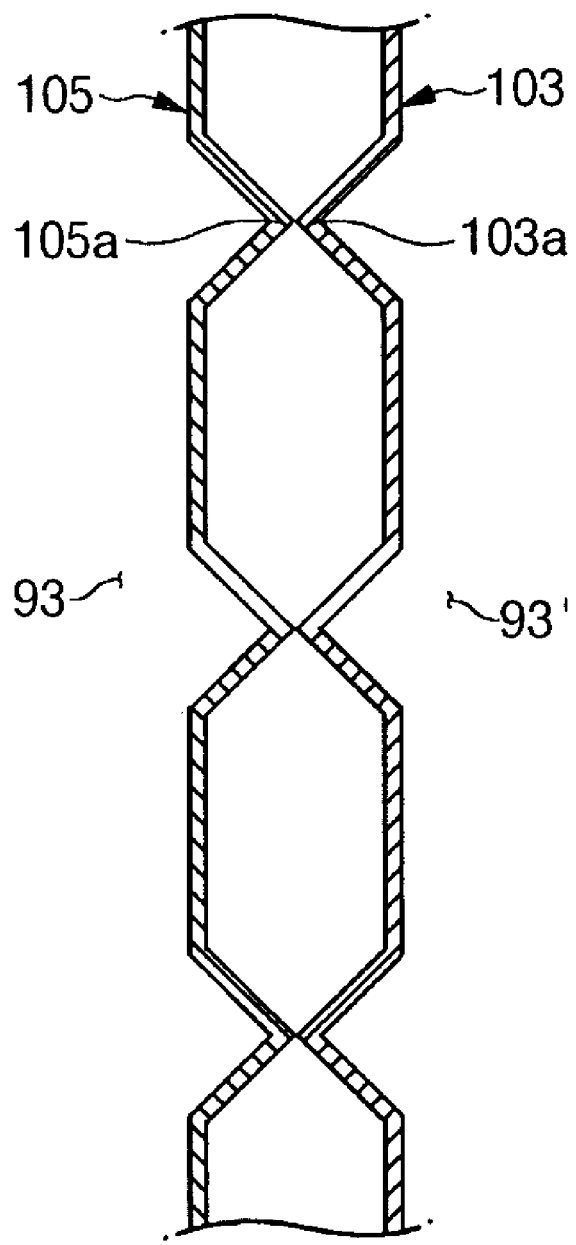

FIGS. 17 to 19 show the secondary battery module in which the basic structure is similar to that of FIG. 16, but the protrusions formed on the barrier rib and the auxiliary barrier rib have different shapes.

In FIG. 17, a protrusion 95a of a barrier rib 95 and a protrusion 97a of an auxiliary barrier rib 97 have a hemisphere shape. In FIG. 18, a protrusion 99a of a barrier rib 99 and a protrusion 101a of an auxiliary barrier rib 101 have a shape of a cylinder or prism. In FIG. 19, a protrusion 103a of a barrier rib 103 and a protrusion 105a of an auxiliary barrier rib 105 have the shape of a cone or pyramid.

Figure 20:
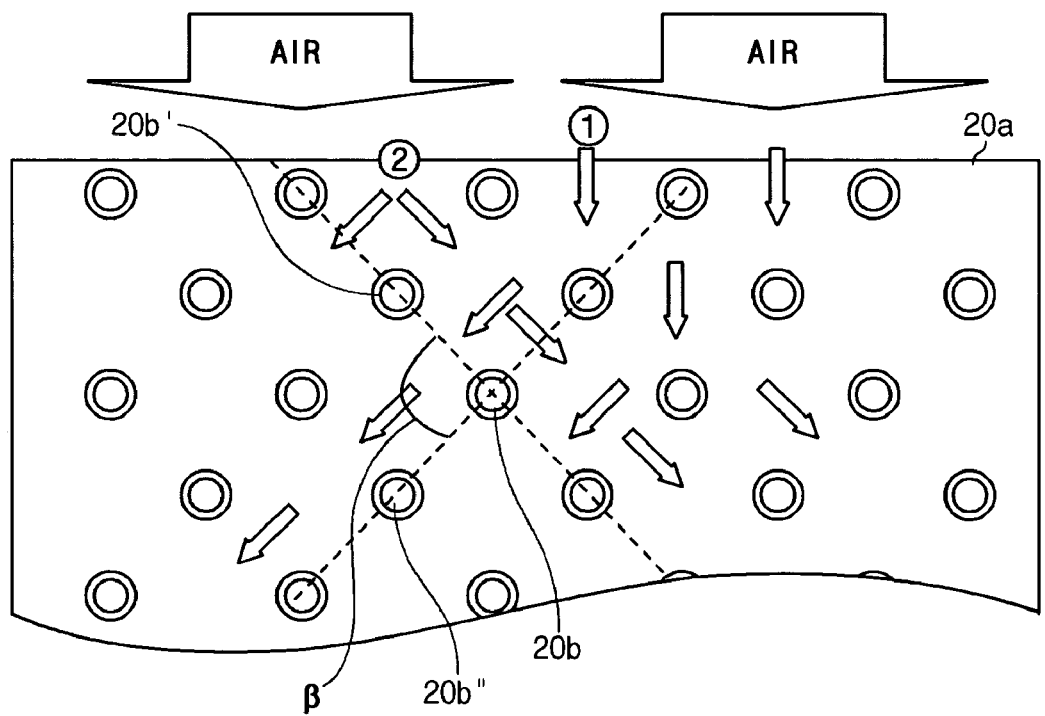
FIG. 20 is a drawing illustrating the function of the barrier ribs according to the first embodiment of the present invention.

Referring now to FIG. 20, and described with respect to the barrier rib shown in FIG. 2 for the convenience, when the protrusions of the barrier rib are disposed on the base, these protrusions may be formed to meet the following formulas. When the protrusions 20b, 20b', and 20b" are formed in a staggered array on the base 20a, the angle ($\beta$) can meet the following formula:

$$30° \leq \beta \leq 150° \qquad \text{i)}$$

ii) where $\beta$ is, with respect to one protrusion 20b disposed in a column, an angle between other protrusions 20b' and 20b" which are adjacent to the one protrusion 20b and disposed in other directions intersecting the one protrusion 20b.

In addition, the angle ($\beta$) can meet the following formula:

$$45° \leq \beta \leq 60° \qquad \text{i)}$$

If the air flows into the barrier rib 20 through the inlet 12a of the housing 12 to contact one protrusion 20b' of the barrier rib 20 by such an arrangement of the protrusions 20b, 20b', and 20b", it is dispersed into both directions with respect to the protrusion 20b' (Arrows 1 and 2 in FIG. 20).

In such a way, the air passing through the barrier rib 20 is dispersed at all protrusions of the barrier rib 20 so it changes its progress path to float. Then, the speed of air flow may be a factor which influences the cooling efficiency of the unit battery.

That is, if the air does not have a proper speed, when the air passes through the barrier rib 20, it is not effectively dispersed within the barrier rib 20 so the heat exchange does not occur. This causes the decrease of the cooling efficiency of the unit battery.

Furthermore, if the air does not have a proper speed, pressure drop within the barrier rib 20 is increased to thereby increase the resistance to the air flow passing through the housing 12. This increases the load of the apparatus providing air to the housing 12 for increasing a flow speed, for example, a cooling fan, as well as decreases the cooling efficiency of the unit battery, which causes another problem.

Considering these points, the present embodiment allows the air to have a proper flow speed by maintaining the angle ($\beta$) within the above range to maximize the cooling efficiency for the unit battery.

Continuous experiments have been carried out which indicate that if the angle ($\beta$) is less than 30°, the heat exchange efficiency becomes too low, and if the angle ($\beta$) is more than 150°, the flow speed of the air becomes too low to satisfy the cooling efficiency of the unit battery.

The secondary battery module of in accordance with the present invention is provided with sufficient strength as a result of the barrier ribs, and because the barrier ribs have the protrusions, it enables the unit batteries to be efficiently cooled as well as preventing the distortion of the unit batteries.

The secondary battery module may be effectively used for motor driving machines such as the hybrid electric vehicles, electric vehicles, motor scooters, motorbikes, or electric vacuum cleaners requiring high power.

Although the barrier ribs described above are made of the aluminum, they may be made of insulating material, such as plastics, as well as metals, such as aluminum.

Although exemplary embodiments of the present invention have been shown and described, it would be appreciated by those skilled in the art that changes may be made to the embodiments without departing from the principles and spirit of the invention, the scope of which is defined in the claims and their equivalents.

What is claimed is:

1. A secondary battery module comprising:
   a plurality of unit batteries adjacently spaced apart from each other; and
   a barrier rib between adjacent unit batteries of the plurality of unit batteries, the barrier rib comprising a plate shaped base physically contacting a first unit battery of the adjacent unit batteries, and a plurality of protrusions on the base and physically contacting a second unit battery of the adjacent unit batteries,
   wherein a first protrusion of the plurality of protrusions is adjacent to and spaced apart from one protrusion of the plurality of protrusions in a first direction, and a second protrusion of the plurality of protrusions is adjacent to and spaced apart from the one protrusion in a second direction,
   wherein the barrier rib is configured to pass air between the first and second unit batteries of the adjacent unit batteries from an inlet side of the barrier rib to an outlet side of the barrier rib, and protrusions of the plurality of protrusions are in an array on the plate shaped base, the array comprising a plurality of first columns in a direction from the inlet side to the outlet side and a plurality of second columns adjacent the first columns, and the protrusions in the first columns being staggered from the protrusions in the second columns,
   wherein the one protrusion is in a first column of the plurality of first columns, the first and second protrusions are in a second column of the plurality of second columns that is adjacent the first column, and the secondary battery module meets the following formula:

$$30° \leq \beta \leq 150°$$

where $\beta$ is, with respect to the one protrusion, the angle between the first direction and the second direction.

2. The secondary battery module of claim 1, wherein the plurality of protrusions is on one surface of the plate shaped base.

3. The secondary battery module of claim 1, wherein a protrusion has a conical shape or a pyramid shape.

4. The secondary battery module of claim 3, wherein the protrusion has a conical shape with a cutaway apex area.

5. The secondary battery module of claim 1, wherein a protrusion has a cylindrical shape or prism shape.

6. The secondary battery module of claim 1, wherein a protrusion has a hemisphere shape.

7. The secondary battery module of claim 1, wherein an inside of a protrusion has a groove.

8. The secondary battery module of claim 1, wherein a protrusion of the plurality of protrusions has a shape with an inclined plane inclined at a predetermined angle with respect to one surface of the barrier rib.

9. The secondary battery module of claim 8, wherein the secondary battery module meets the following formula:

$$45° \leq \alpha \leq 90°$$

where $\alpha$ is the predetermined angle.

10. The secondary battery module of claim 9, wherein the secondary battery module meets the following formula:

$$50° \leq \alpha \leq 70°$$

where $\alpha$ is the predetermined angle.

11. The secondary battery module of claim 10, wherein the secondary battery module meets the following formula:

$$55° \leq \alpha \leq 65°$$

where $\alpha$ is the predetermined angle.

12. The secondary battery module of claim 1, wherein protrusions of the plurality of protrusions are in a lattice array on the base.

13. The secondary battery module of claim 1, wherein unit batteries of the plurality of unit batteries have a substantially square shape.

14. The secondary battery module of claim 1, wherein the secondary battery module includes a housing mounting the plurality of unit batteries and having a cooling medium input and a cooling medium output adapted for use in a motor driven device.

15. The secondary battery module of claim 1, wherein the secondary battery module meets the following formula:

$$45° \leq \beta \leq 60°$$

where $\beta$ is, with respect to the one protrusion, the angle between the first direction and the second direction.

16. The secondary battery module of claim 1, wherein a protrusion of the plurality of protrusions comprises a solid protrusion.

* * * * *